(12) United States Patent
Witte

(10) Patent No.: US 8,548,707 B2
(45) Date of Patent: Oct. 1, 2013

(54) BRAKING SYSTEM AND METHOD FOR BRAKING A VEHICLE HAVING A HYBRID DRIVE

(75) Inventor: Bastian Witte, Gross Schwuelper (DE)

(73) Assignee: Volkswagen AG, Wolfsburg (DE)

( * ) Notice: Subject to any disclaimer, the term of this patent is extended or adjusted under 35 U.S.C. 154(b) by 844 days.

(21) Appl. No.: 12/443,647

(22) PCT Filed: Sep. 11, 2007

(86) PCT No.: PCT/EP2007/007884
§ 371 (c)(1),
(2), (4) Date: Jan. 12, 2010

(87) PCT Pub. No.: WO2008/037347
PCT Pub. Date: Apr. 3, 2008

(65) Prior Publication Data
US 2010/0138117 A1    Jun. 3, 2010

(30) Foreign Application Priority Data
Sep. 28, 2006   (DE) .................. 10 2006 046 093

(51) Int. Cl.
*B60T 7/12*     (2006.01)
(52) U.S. Cl.
USPC ........... 701/70; 701/71; 180/65.275; 903/947
(58) Field of Classification Search
USPC .............. 180/65.21, 65.275, 65.27; 903/947; 701/48, 70, 71
See application file for complete search history.

(56) References Cited

U.S. PATENT DOCUMENTS

| | | | |
|---|---|---|---|
| 5,318,355 | A | 6/1994 | Asanuma et al. |
| 5,618,084 | A | 4/1997 | Reiner |

(Continued)

FOREIGN PATENT DOCUMENTS

| | | |
|---|---|---|
| DE | 44 43 814 | 2/1996 |
| DE | 198 42 472 | 3/1999 |

(Continued)

OTHER PUBLICATIONS

Fuehrer et al., Method for control of brake system of motor vehicle involves predetermining maximum nominal braking moment for electrically regenerative brake which is variably calculated from travelling situation of vehicle, Feb. 16, 2006, Germany, DE 10 2004 061 107 A1, Machine translation of Description.*

(Continued)

*Primary Examiner* — Ruth Ilan
*Assistant Examiner* — James English
(74) *Attorney, Agent, or Firm* — Kenyon & Kenyon LLP

(57) ABSTRACT

In a braking system and a method for braking a vehicle having a hybrid drive, at least one wheel, preferably at least the wheels of one axle, is brakable by a regenerative brake and by a service brake. The braking system includes a vehicle stability control system, which ascertains state variables describing a driving dynamics of the vehicle, for which there exist threshold values and/or threshold value combinations. The vehicle stability control system is arranged such that when reaching, exceeding and/or undershooting one of the threshold values or one of the threshold value combinations a wheel-specific braking force control is effected. A predefined maximum regenerative braking force is determined on the basis of the state variables ascertained by the vehicle stability control system and the regenerative brake is controlled such that the regenerative braking force exerted on the at least one wheel does not exceed the determined predefined maximum regenerative braking force.

17 Claims, 3 Drawing Sheets

(56) References Cited

U.S. PATENT DOCUMENTS

| | | | |
|---|---|---|---|
| 6,231,134 B1 | 5/2001 | Fukawawa et al. | |
| 2002/0030408 A1 | 3/2002 | Niwa et al. | |
| 2002/0180266 A1* | 12/2002 | Hara et al. | 303/152 |
| 2003/0230933 A1 | 12/2003 | Schneider et al. | |
| 2004/0046448 A1 | 3/2004 | Brown | |
| 2008/0100129 A1* | 5/2008 | Lubbers | 303/113.1 |
| 2008/0221766 A1 | 9/2008 | Maeda et al. | |
| 2008/0228367 A1* | 9/2008 | Aoki et al. | 701/70 |
| 2009/0012686 A1* | 1/2009 | Maeda et al. | 701/70 |

FOREIGN PATENT DOCUMENTS

| | | |
|---|---|---|
| DE | 199 12 425 | 7/2000 |
| DE | 101 45 157 | 4/2002 |
| DE | 103 27 502 | 1/2004 |
| DE | 10 2004 061 107 | 2/2006 |
| EP | 1 197 409 | 4/2002 |
| EP | 1 849 745 | 10/2007 |
| WO | WO 2006/083008 | 8/2006 |

OTHER PUBLICATIONS

Mueller et al., Vehicle dynamics control method, Apr. 17, 2002, EPO, EP 1197409 A2, Machine translation of Description.*

Fuehrer et al., Method for control of brake system of motor vehicle involves predetermining maximum nominal braking moment for electrically regenerative brake which is variably calculated from travelling situation of vehicle, Feb. 16, 2006, EPO, DE 10 2004 061 107 A1, Machine translation of Description.*

Mueller et al., Vehicle dynamics control method, Apr. 17, 2002, EPO, EO 1197409 A2, Machine translation of Description.*

International Search Report, PCT/EP2007/007884 dated Jan. 7, 2008.

Search Report, German Patent Application No. 10 2006 046 093.6.

* cited by examiner

BRAKING SYSTEM AND METHOD FOR BRAKING A VEHICLE HAVING A HYBRID DRIVE

FIELD OF THE INVENTION

The present invention relates to a braking system for a vehicle having a hybrid drive, e.g., in which at least one wheel, preferably at least the wheels of one axle, is capable of being braked by a regenerative brake and by a service brake, a vehicle stability control system being provided, which ascertains state variables describing a driving dynamics of the vehicle, for which threshold values and/or threshold value combinations exist, the vehicle stability control system being designed to effect a wheel-specific braking force control when reaching, exceeding and/or undershooting one of the threshold values or one of the threshold value combinations. Furthermore, the present invention relates to a method for operating such a braking system.

BACKGROUND INFORMATION

A hybrid drive of a vehicle is distinguished by the fact that the vehicle includes at least two different driving motors. Today, hybrid drives normally include one internal combustion engine and one electric machine. The advantage of a hybrid drive is that the vehicle may be driven in different driving situations using the different driving motors. This makes it possible to save energy. This is further augmented by the fact that the electric machine may be utilized for recuperating energy that is released when the vehicle is decelerated. This means that the electric machine is utilized as an electric generator for producing electric current. This electric current is used to charge an electrical energy store. The electrical energy stored in the electrical energy store may be used subsequently to drive the electric machine and thereby the vehicle. An electric machine operable as a generator thus represents a regenerative brake. Motor vehicles additionally have so-called service brakes, which are normally operated hydraulically, pneumatically, electromechanically etc.

Fundamentally, it is desirable to utilize as great a regenerative braking force as possible in order to obtain as much energy as possible in a deceleration of the vehicle. The result of this, however, is that a braking force distribution between the individual axles of the vehicle normally deviates from an optimal braking force distribution that would have to be chosen for an optimal stability of the vehicle. This means that the at least one wheel or the wheels of the at least one axle that are braked regeneratively normally are overbraked in comparison to a braking force distribution that would be optimal for a vehicle stability. For example, if the regenerative brake is connected to the front wheels of a vehicle, then the vehicle tends to understeer due to an overbraking of the front wheels. On the other hand, if the wheels of a rear axle are braked regeneratively and thus frequently overbraked, then the vehicle tends to oversteer.

In vehicles that are not equipped with a regenerative brake, a vehicle stability control system is known to be provided that ascertains and monitors state variables that describe a driving dynamics of the vehicle, for example a vehicle speed, a longitudinal acceleration, a transversal acceleration, etc. Threshold values exist for the individual state variables or a combination of state variables. If one of these threshold values is reached, then the vehicle stability control system uses the service brakes to effect a wheel-specific braking force control. This means that the braking force distribution between the individual wheels, i.e. a braking torque distribution, is changed so as to have a positive influence on the stability of the vehicle.

German Published Patent Application No. 103 27 502 describes a regulation for regeneratively braking a motor vehicle, including a regulating system of yaw stability, an ability to provide a regenerative braking torque on wheels of at least one axle, non-regenerative brakes that are connected to the wheels of at least one axle, a regulator and a regulating system implemented in the regulator for controlling the regulator so as to regulate regenerative braking and non-regenerative braking when operating the regulating system of yaw stability. The system is developed such that it has the ability to receive an input signal from a yaw stability regulating system, to compare the current braking equilibrium with a desired braking equilibrium, to determine whether the front wheels or rear wheels are overbraked in comparison to the desired braking equilibrium and to set the regenerative braking variable and the non-regenerative braking variable. The yaw stability regulating system is used to determine whether a state of understeering or of oversteering exists. The regenerative braking force is thus adjusted as a function of the occurrence of a vehicle instability in the form of oversteering or understeering.

U.S. Pat. No. 5,318,355 describes a vehicle having regenerative brakes in which it is possible to switch between a preferred regenerative braking mode and a normal braking mode such that a total braking force of all wheels remains constant. In the preferred regenerative operating mode, the wheels that are braked regeneratively are overbraked with respect to a theoretical braking force distribution. In the normal operating mode, the braking force distribution matches the theoretical braking force distribution. A switch between the operating modes occurs via a control system, for example if a steering angle and a vehicle speed are no longer lower than predefined values. With this device, regenerative braking is not possible at higher vehicle speeds.

German Published Patent Application No. 198 42 472 describes a braking system for a motor vehicle having a plurality of wheels including at least one driven wheel having: a friction braking device for pressing a friction part on a rotor rotating with the wheels so as thereby to apply a friction braking torque onto each wheel; a regenerative braking device, which includes at least one electric motor, which is connected to the at least one driven wheel, for applying a regenerative braking torque onto the at least one driven wheel; and a total braking torque control device for controlling a total braking torque, which includes at least the regenerative braking torque or the friction braking torque that is applied to each of the wheels existing in the plural, the total braking torque control device working, when the total braking torque applied to at least one of the wheels existing in the plural exceeds an upper limit corresponding to a coefficient of friction of a road surface on which the motor vehicle is traveling, so as to bring to zero the regenerative braking torque of each of the wheels existing in the plural, of which at least one exists, and to control the friction braking torque of each of the wheels, of which at least one exists, while an influence of the process of bringing the regenerative braking torque to zero is reduced. Thus, if the braking torque applied on one of the wheels exceeds an upper limit that is a function of a coefficient of friction of the road, then the regenerative braking torque is regulated to zero. The vehicle described in German Published Patent Application No. 198 42 472 thus includes a regulating system that attempts to integrate the regenerative brakes into an anti-lock braking system.

German Published Patent Application No. 199 12 425 describes a combined motor vehicle braking device including a friction brake and an electric machine brake, in particular in the form of a starter generator. To increase the ease of operation while at the same time preventing a vehicle battery, which is able to be powered by the electric machine brake in generator operation, from over loading, a brake activation element, in particular a foot brake pedal, is provided with a control system for automatically distributing the respective brake load between the friction brake and the electric machine brake. A brake load distribution between the electric machine brake and the friction brake may be selected as a function of a state of charge of the vehicle battery.

The conventional systems do not ensure that the occurrence of an unstable driving state is prevented and that at the same time in any operating state there occurs the greatest possible regenerative braking operation and thus energy recuperation.

SUMMARY

Example embodiments of the present invention provide a braking system for a vehicle having a hybrid drive and a method for braking such a vehicle, which will avoid critical driving states with respect to vehicle stability and at the same time obtain as much regenerative energy when braking as possible.

Example embodiments of the present invention provide a braking system for a vehicle having a hybrid drive, in which at least one wheel, preferably at least the wheels of one axle, is capable of being braked by a regenerative brake and by a service brake, a vehicle stability control system being provided, which ascertains state variables describing a driving dynamics of the vehicle, for which threshold values and/or threshold value combinations exist, the vehicle stability control system being adapted to effect a wheel specific braking force control when reaching, exceeding and/or undershooting one of the threshold values or one of the threshold value combinations, a predefined maximum regenerative braking force being determinable on the basis of the state variables ascertained by the vehicle stability control system and the regenerative brake being controllable such that a regenerative braking force applied on the at least one wheel does not exceed the determined predefined maximum regenerative braking force. This means that a predefined maximum regenerative braking force is determined on the basis of the state variables ascertained by the vehicle stability control system. The regenerative brake is subsequently controlled such that the regenerative braking force exerted on the at least one wheel does not exceed the predefined maximum regenerative braking force. This ensures that the regenerative braking force is already limited beforehand such that a vehicle instability does not occur, rather than being reduced only in consequence of an unstable driving state that has already occurred. Since a regenerative brake normally reacts more slowly and is in particular difficult to control in a wheel-specific manner, it is necessary to regulate the regenerative braking force such that an unstable vehicle state is as much as possible avoided. While a conventional vehicle stability control system, which is referred to, for example, as an ESP (electronic stability program), is triggered when a transversal acceleration limiting value and a yaw rate limiting value are jointly reached/exceeded, both limiting values being possibly a function of speed, example embodiments of the present invention provide a regenerative braking force such that a triggering state of the vehicle stability control system is not reached because the latter is caused by at least one of the vehicle wheels being overbraked by the regenerative brake.

Example embodiments therefore provide for the predefined maximum regenerative braking force to be determinable such that the individual ascertained state variables maintain a safety margin distance from the threshold values or threshold value combinations, the reaching, exceeding and/or undershooting of which result in the triggering of a wheel-specific braking force control.

Example embodiments provide for one of the state variables to be a friction coefficient utilization. The friction coefficient utilization indicates how many percent of the possible forces transmittable onto the roadway via the wheels of the vehicle are already utilized. A variable of a roadway friction coefficient used for the calculation is already calculated in vehicle stability control systems such as are today part of the related art.

Example embodiments of the present invention therefore provide for the friction coefficient utilization to be ascertained on the basis of a roadway friction coefficient and a transversal acceleration.

Example embodiments, in which a longitudinal acceleration is included in ascertaining the friction coefficient utilization, allow for even more precise information about the friction coefficient utilization. In this case, the friction coefficient utilization is thus ascertained by taking into account the longitudinal and transversal acceleration. A friction coefficient utilization is calculated from the quotient of an acceleration and a product of the gravitational acceleration and a roadway friction coefficient. If the acceleration is composed of a transversal acceleration and a longitudinal acceleration, then a quadratic mean is determined. This means that use is made of the square root of the sum of the individual squares of acceleration.

Example embodiments of the present invention provide for the state variables to include a transversal acceleration, a yaw rate and a vehicle speed. As already explained above, in vehicle stability control systems, the wheel-specific braking force control is often triggered if both the transversal acceleration as well as the yaw rate respectively exceed a predefined threshold value, i.e., exceed a combination of the threshold values in the sense of what is described here, the individual threshold values or the combination of the threshold values being a function of a vehicle speed. In such an example embodiment, an initial maximum regenerative braking force may be reduced, for example, when one of the two threshold values of the threshold value combination is exceeded. This ensures that a safety margin with respect to the individual, threshold values or the threshold value combination is maintained.

In example embodiments, a setpoint value for the yaw rate is calculated within the vehicle stability control system from the vehicle speed and a steering wheel angle. For the setpoint value, there exist an upper threshold value that is greater than the setpoint value and a lower threshold value that is smaller than the setpoint value. The upper threshold value and the lower threshold value are a function of the setpoint value. If one plots the upper threshold value and the lower threshold value against the setpoint value of the yaw rate, then one obtains a tolerance band for the yaw rate. If a measured yaw rate lies outside of the tolerance band, i.e., if the measured yaw rate is greater than the upper threshold value for the ascertained setpoint value of the yaw rate or smaller than the associated lower threshold value, then a wheel-specific braking force control is initiated. A reduction of the predefined maximum regenerative braking force, however, is effected when "leaving" a narrower additional tolerance band. In this example embodiment, the ascertained state variables thus include a measured yaw rate, a vehicle speed and a steering wheel angle. The threshold values that form the additional tolerance band and which maintain a safety margin are a function of the setpoint value of the yaw rate just as the safety margin itself, i.e., of the vehicle speed and the steering wheel angle. Example embodiments of the present invention therefore provide for the state variables to include a vehicle speed, a steering wheel angle and a measured yaw rate.

In addition to the determined predefined maximum regenerative braking force, for controlling the regenerative brake it is likewise necessary to know how great the braking force is that the regenerative brake is able to provide. This depends, for example, on how high a charge state of an electrical energy store is. If the latter is nearly or entirely charged, then the regenerative brake is only able to provide little or no regenerative braking energy. Example embodiments of the present invention therefore provide for a maximally applicable regenerative braking power to be ascertained and to be included in controlling the regenerative brake.

In order to make a change in the braking force provided by the regenerative brake as transparent as possible for the driver, i.e. so that such a change in the braking force is not noticed by the driver, example embodiments of the present invention provide for the service brakes on the wheels of the vehicle to be controlled such that the braking force generated by the service brakes of the wheels corresponds to a difference between a braking force requested by a driver and the controlled regenerative braking force.

The use of a braking system according to example embodiments of the present invention provides for the individual state variables to maintain a safety margin distance from their threshold values, which result in the triggering of a wheel-specific braking force control. If a driving state should nevertheless occur, in which a state variable or a combination of state variables respectively no longer maintain a second safety margin distance, which is lower than the safety margin distance, from the threshold values or the combination of threshold values, then example embodiments for the regenerative braking force be set to zero. This means that the regenerative braking force is entirely omitted if there is a danger of an imminent vehicle instability. In such a case, the regenerative braking force is preferably dispensed with in the continuing braking operation in order to exclude a vehicle instability entirely and to be able at any time to utilize to the full extent the higher reaction speed of the service brakes. Only in a new braking operation is the regenerative braking force again utilized for decelerating the vehicle.

The features of the method according to example embodiments of the present invention have the same advantages as the corresponding features of the braking system according to example embodiments of the present invention.

Example embodiments of the present invention are explained in greater detail below with reference to the appended Figures.

DETAILED DESCRIPTION

Figure 1:
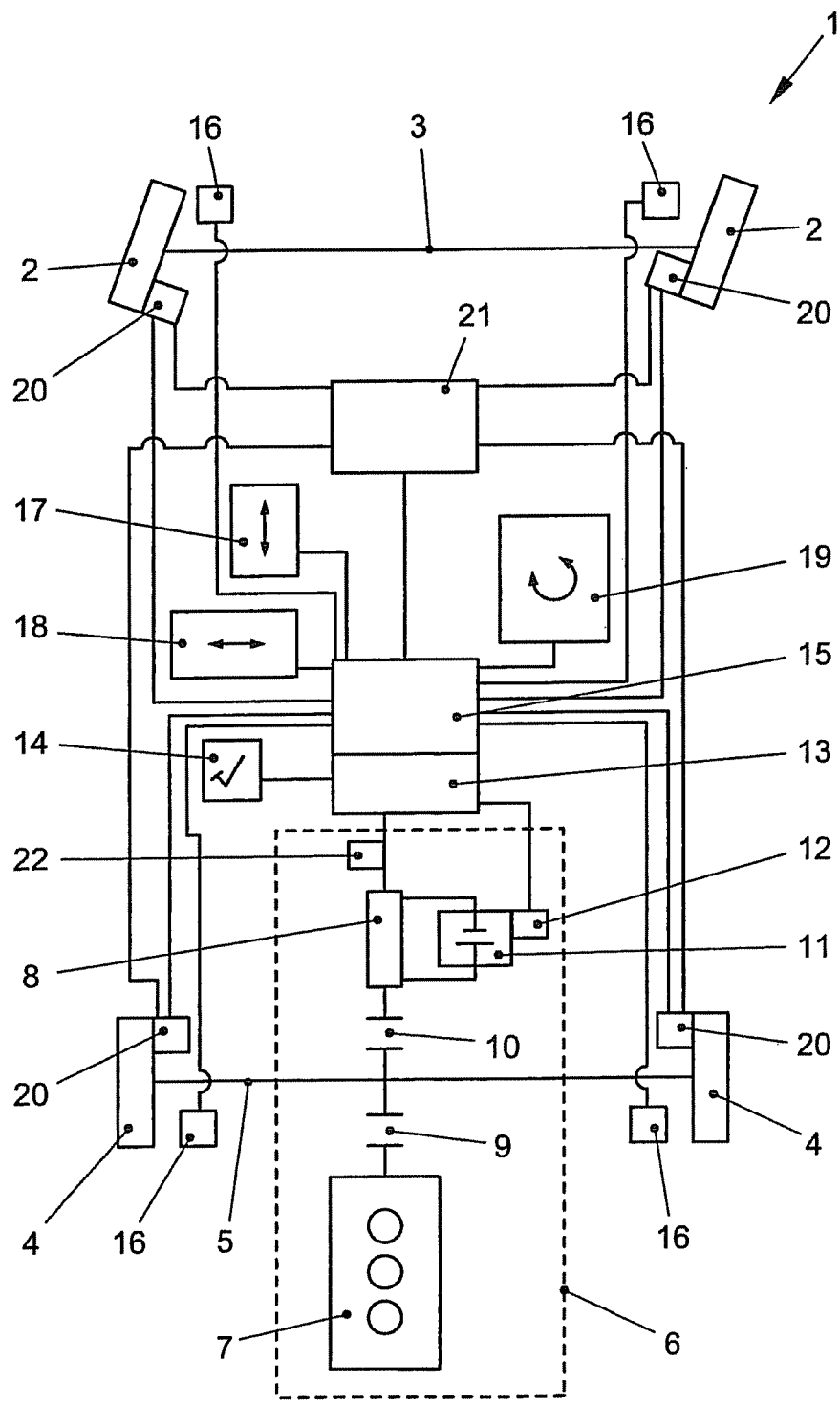
FIG. 1 a schematic representation of a motor vehicle having an example embodiment of a braking system.

FIG. 1 schematically shows a vehicle 1 that includes an example embodiment of a braking system. Vehicle 1 includes steerable, non-driven wheels 2 of a front axle 3. Non-steerable wheels 4 of a rear axle 5 are drivable by a hybrid drive 6. Hybrid drive 6 includes an internal combustion machine 7 and an electric machine 8. Internal combustion machine 7 and electric machine 8 are operably connectible to rear axle 5 respectively via a clutch 9, 10. One or more existing gear units are not shown. Electric machine 7 is coupled to an electrical energy store 11. Electrical energy stored in electrical energy store 11 may be used to drive electric machine 8. Electric machine 8, however, may also be operated as a generator and feed electrical energy into electrical energy store 11. A charging and monitoring unit 12 monitors the charge state of electrical energy store 11 and regulates an infeed and withdrawal of energy. Furthermore, charging and monitoring unit 12 provides information about a maximum energy absorbable by the battery to a control unit 13, in which a braking control of the braking system is implemented. In the event of a braking request on the part of a driver via an actuator 14 in the form of a brake pedal, a desired braking force is supplied to control unit 13 as a function of a deflection of the brake pedal.

A vehicle stability control system 15 is integrated into control unit 13. Vehicle stability control system 15 evaluates sensor signals from wheel pulse sensors 16, a longitudinal acceleration sensor 17, a transversal acceleration sensor 18, a yaw rate sensor 19 and possibly additional sensors that are not shown. In example embodiments, different and/or additional sensors may be evaluated in order to ascertain state variables that describe a driving dynamics of vehicle 1. Vehicle stability control system 15 is coupled to service brakes 20 disposed on driven wheels 2 and non-driven wheels 4 such that a braking force may be controlled in a wheel-specific manner. Such a wheel-specific braking force control is exercised when vehicle stability control system 15 has established for individual state variables or a combination of state variables, which are ascertained on the basis of the received sensor signals, that a corresponding threshold value or a combination of threshold values has been exceeded, which indicates a vehicle instability. The wheel-specific braking force control is implemented such that the stability of the vehicle is maintained or reestablished. Service brakes 20 are furthermore coupled to a central braking force generator 21, which normally takes the form of a pneumatic brake booster and which effects a balanced braking force distribution to individual service brakes 20. Central braking force generator 21 is connected to control unit 13 and is controlled by the latter.

Apart from being braked by service brakes 20, driven wheels 4 may also be braked regeneratively by electric machine 8, when the latter is operated as a generator. Control unit 13 of the braking system is arranged such that it determines and controls both the regenerative braking force applied by electric machine 8 in combination with electrical energy store 11 as well as the non-regenerative braking force 20 applied by the service brakes in cooperation with central braking force generator 15.

Figure 2:
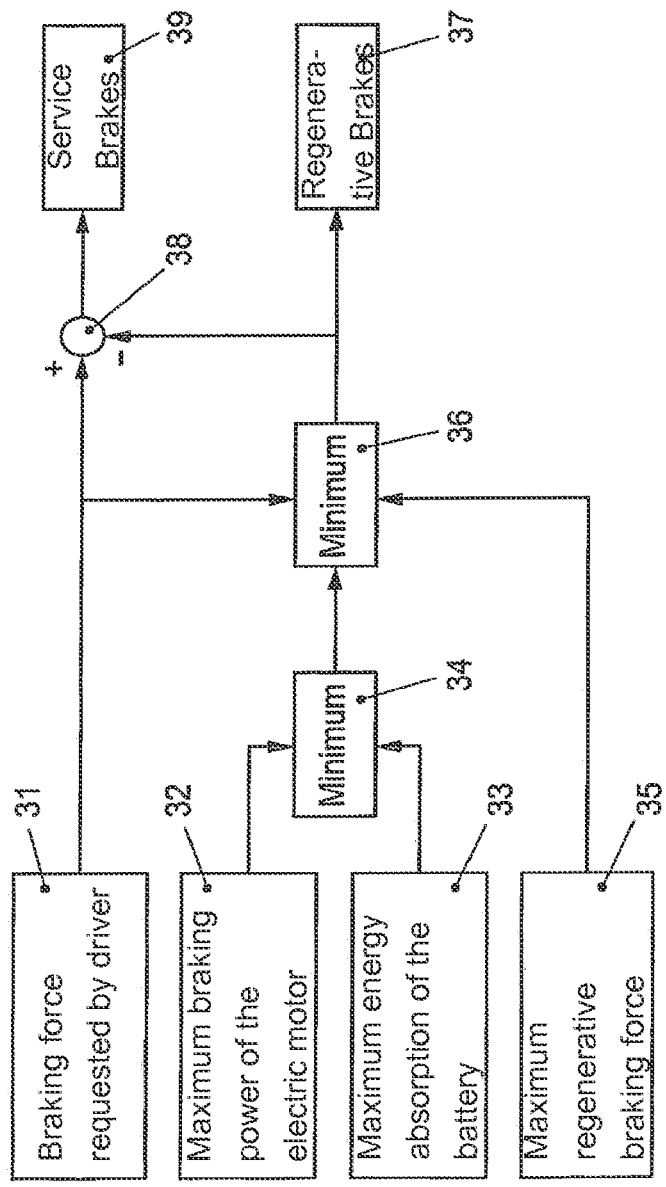
FIG. 2 a schematic block diagram for explaining the determination of the regenerative braking force and of the braking force applied by service brakes.

In FIG. 2, a block diagram shows in a rough schematic manner how the braking force applied by the service brakes and the braking force applied by the regenerative brake is defined and controlled.

A braking force requested by the driver, which is proportional to a deflection of actuator 14 in the form of a brake pedal, is transmitted 31 to control unit 13. An electric machine control unit 22 transmits 32 a maximum braking power of the electric motor to control unit 13. Charging and monitoring unit 12 transmits 33 a maximum energy absorption of the battery. From the latter, the braking system determines by minimum formation a maximum braking force 34 suppliable by the regenerative brake. On the basis of the monitored state variables, vehicle stability control system 15 ascertains a predefined maximum regenerative braking force that the regenerative brake is able to apply without the danger of a vehicle instability 35. The regenerative braking force is determined 36 via a new minimum value formation between the predefined regenerative braking force and the maximally suppliable regenerative braking force as well as the braking force requested by the driver. According to this determination, the regenerative brake is controlled 37 by electric machine control unit 22. The braking force for the service brakes is ascertained 38 by a difference formation between the requested braking force and the regenerative braking force supplied by the regenerative brake. The service brakes are controlled 39 accordingly via central braking force generator 21.

A determination of the maximum braking power permitted from the perspective of driving dynamics, as is performed in functional block 35, is preferably implemented on the basis of a friction coefficient utilization η. For this purpose, either the transversal friction coefficient utilization $\eta_q$ or a longitudinal and transversal friction coefficient utilization $\eta_{lq}$ may be used. The transversal friction coefficient utilization $\eta_q$ is computed according to the following formula $$\eta_q = \frac{\ddot{y}}{\mu \cdot g},$$

where ÿ indicates the transversal acceleration, μ a roadway friction coefficient and g the gravitational acceleration. In a vehicle stability control system, roadway friction coefficient μ is a known operand. The ascertainment will not be explained here in greater detail since it is known to one skilled in the art from the related art.

The following formula describes the longitudinal and transversal friction coefficient utilization $\eta_{lq}$:

$$\eta_{lq} = \frac{\sqrt{\ddot{x}^2 + \ddot{y}^2}}{\mu \cdot g},$$

where ẍ indicates the longitudinal acceleration.

The predefined maximum regenerative braking force is preferably determined such that it is set to equal a maximum possible braking force of the vehicle when the friction coefficient utilization is below 50%. Above a friction coefficient utilization of 50% up to a friction coefficient utilization of 75%, the maximum predefined regenerative braking force is reduced steplessly or stepwise until it reaches a value of 0 at a friction coefficient utilization of 75%. At a friction coefficient utilization above 75%, the vehicle is thus braked exclusively by the service brake, while in the transitional range between a friction coefficient utilization of 50% and a friction coefficient utilization of 75%, the "missing" braking force not applied by the regenerative brake is applied by the service brakes and is thus quasi substituted on the basis of the described control by the braking system. The friction coefficient utilization limit values that were mentioned here may also be defined differently. Furthermore, the reduction of the predefined maximum regenerative braking force may occur linearly or along another monotonic, preferably continuous, function. For this purpose, additional state variables of such a function may be drawn upon, for example as parameters. In any event, the predefined maximum regenerative braking force is defined in such a way that each of the state variables, which is able to trigger a wheel-specific braking force control, maintains a safety margin distance from the corresponding threshold value or a threshold value combination. If this is undershot, then the predefined maximum regenerative braking force is reduced. As soon as a second safety margin distance situated closer to the threshold value or a threshold value combination is undershot, then the predefined maximum regenerative braking force is set to zero and is preferably not increased again in the same braking operation.

Alternatively or additionally there is a provision in some vehicles for a setpoint value for the yaw rate of the vehicle to be calculated within the vehicle stability control system from a vehicle speed and a steering wheel angle. A tolerance band is around this setpoint value. The tolerance band is bounded by an upper threshold value and a lower threshold value, which respectively are a function of the calculated setpoint value of the yaw rate. Furthermore, for each setpoint value of the yaw rate a narrower additional tolerance band is defined. This additional tolerance band is bounded by another upper threshold value and another lower threshold value, which respectively are likewise a function of the setpoint value of the yaw rate. If the measured yaw rate exceeds the additional upper threshold value or if the measured yaw rate falls below the additional lower threshold value, then the predefined maximum regenerative braking force is reduced such that the upper threshold value is not exceeded and the lower threshold value is not undershot, which respectively would cause a triggering of a wheel-specific braking force control.

Figure 3:
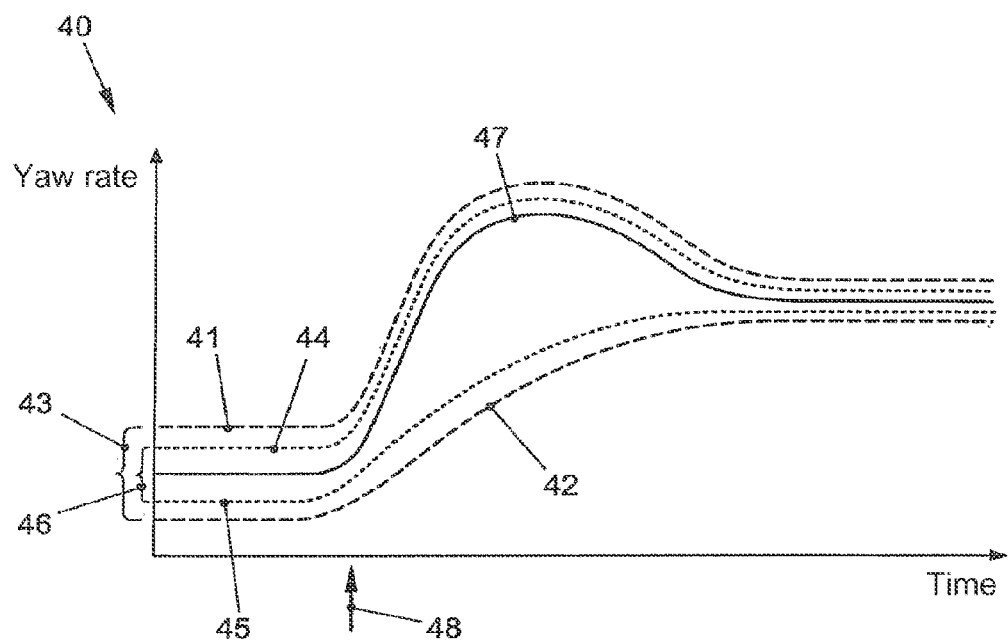
FIG. 3 a graphical representation of a measured yaw rate, a tolerance band for an intervention of a wheel-specific braking force control and another tolerance band, at the leaving of which a reduction of the predefined maximum regenerative braking force sets in, against time for a vehicle moved at constant speed, the steering wheel angle of which is changed.

FIG. 3 shows a graph 40 in which an upper threshold value 41 and a lower threshold value 42 are plotted against time. Upper threshold value 41 and lower threshold value 42 bound a tolerance band 43 for triggering a wheel-specific braking force control. An additional upper threshold value 44 and an additional lower threshold value 45, which bound another tolerance band 46, are likewise shown. In addition, a measured yaw rate 47 of a vehicle is plotted against time. The vehicle moves at a constant speed. At a time indicated by an arrow 48, a steering motion sets in that brings with it a change of the steering wheel angle. This changes both the measured yaw rate as well as a setpoint value of the yaw rate, on which upper threshold value 41, the lower threshold value, the additional upper threshold value 44 and the additional lower threshold value 45 depend. In the example shown, measured yaw rate 47 does not leave additional tolerance band 46 at any time such that during the entire steering operation the maximum regenerative braking force may be selected to equal a maximum possible regenerative braking force. If measured yaw rate 47 were to leave additional tolerance band 46, then the predefined maximum regenerative braking force would be reduced, to zero if necessary, in order to avoid upper threshold value 41 from being exceeded and/or lower threshold value 42 from being undershot.

LIST OF REFERENCE CHARACTERS 1 vehicle
2 non-driven wheels
2 front axle
4 driven wheels
5 rear axle
6 hybrid drive 7 internal combustion engine
8 electric machine
9, 10 clutches
11 electrical energy store
12 charging and monitoring unit
13 control unit
14 actuator
15 vehicle stability control system
16 wheel pulse sensors
17 longitudinal acceleration sensor
18 transversal acceleration sensor
19 yaw rate sensor
20 service brakes
21 central braking force generator
22 electric machine controller
31-39 functional blocks of a method for controlling the regenerative brake and the service brakes
40 graph
41 upper threshold value
42 lower threshold value
43 tolerance band
44 additional upper threshold value
45 additional lower threshold value
46 additional tolerance band
47 measured yaw rate
48 arrow

What is claimed is:

1. A braking system for a vehicle having a hybrid drive, comprising:
at least one of (a) a regenerative brake and/or (b) a service brake adapted to brake at least one wheel of at least one axle of the vehicle; and
a vehicle stability control system adapted to ascertain state variables describing a driving dynamics of the vehicle for which at least one of (a) threshold values and/or (b) threshold value combinations exist, the vehicle stability control system adapted to effect a wheel-specific braking force control in response to at least one of (a) reaching, (b) exceeding, and/or (c) undershooting at least one of (a) one of the threshold values and/or (b) one of the threshold value combinations;
wherein a predefined maximum regenerative braking force is determinable in accordance with state variables ascertained by the vehicle stability control system, and the regenerative brake is controllable such that the regenerative braking force exerted on the at least one wheel does not exceed the determined predefined maximum regenerative braking force
wherein the predefined maximum regenerative braking force is determinable such that individual ascertained state variables maintain a first safety margin distance from at least one of (a) the threshold values and/or (b) the threshold value combinations; and
wherein the predefined maximum regenerative braking force is set to zero as soon as one of the state variables undershoots a second safety margin distance within the first safety margin distance from a corresponding one of (a) the threshold values and/or (b) the threshold value combinations.

2. The braking system according to claim 1, wherein one of the state variables represents a friction coefficient utilization.

3. The braking system according to claim 2, wherein the friction coefficient utilization is ascertained in accordance with a roadway friction coefficient and a transversal acceleration.

4. The braking system according to claim 2, wherein a longitudinal acceleration is included when ascertaining the friction coefficient utilization.

5. The braking system according to claim 1, wherein the state variables include a transversal acceleration, a yaw rate and a vehicle speed.

6. The braking system according to claim 1, wherein the state variables include a vehicle speed, a steering wheel angle and a measured yaw rate.

7. The braking system according to claim 1, wherein a maximum applicable regenerative braking power is ascertainable and is included in control of the regenerative brake.

8. The braking system according to claim 1, comprising a service brake, wherein the service brake is controllable such that the braking force generated by the service brake corresponds to a difference between a braking force requested by a driver and the controlled regenerative braking force.

9. A method for braking a vehicle having a hybrid drive, at least one wheel of at least one axle being brakable by a regenerative brake and by a service brake, the vehicle including a vehicle stability control system, comprising:
ascertaining, by the vehicle stability control system, state variables that describe a driving dynamics of the vehicle for which at least one of (a) threshold values and/or (b) threshold value combinations exist;
effecting, by the vehicle stability control system, a wheel-specific braking force control in response to at least one of (a) reaching, (b) exceeding, and/or (c) undershooting at least of (a) one of the threshold values and/or (b) one of the threshold value combinations;
determining a predefined maximum regenerative braking force in accordance with the state variables ascertained by the vehicle stability control system; and
controlling the regenerative brake such that the regenerative braking force exerted on the at least one wheel does not exceed the determined predefined regenerative braking force;
wherein the predefined maximum regenerative braking force is determined such that individual ascertained state variables maintain a first safety margin distance from at least one of (a) the threshold values and/or (b) the threshold value combinations; and
setting to zero the predefined maximum regenerative braking force as soon as one of the state variables undershoots a second safety margin distance within the first safety margin distance from a corresponding one of (a) the threshold values and/or (b) the threshold value combinations.

10. The method according to claim 9, wherein a predefined regenerative braking force that has been set to zero is not increased again in one braking operation.

11. The method according to claim 9, further comprising ascertaining, by the vehicle stability control system, a friction coefficient utilization as one of the state variables.

12. The method according to claim 11, wherein the friction coefficient utilization is ascertained in accordance with a roadway friction coefficient and a transversal acceleration.

13. The method according to claim 11, wherein a longitudinal acceleration is included in ascertaining the friction coefficient utilization.

14. The method according to claim 9, wherein the state variables include a transversal acceleration, a yaw rate and a vehicle speed and the wheel-specific braking force control is triggered if, as a function of the vehicle speed, a threshold value for the transversal acceleration and a threshold value for the yaw rate are jointly exceeded and the predefined maximum regenerative braking force is set to zero when exceeding one of the two threshold values for the transversal acceleration or the yaw rate.

15. The method according to claim 9, wherein the state variables include a vehicle speed, a steering wheel angle and a measured yaw rate.

16. The method according to claim 9, further comprising determining a maximum applicable regenerative braking power and including the maximum applicable regenerative braking power in a control of the regenerative brake.

17. The method according to claim 9, further comprising controlling the service brake such that the braking force generated by the service brake corresponds to a difference between a braking force requested by a driver and the controlled regenerative braking force.

\* \* \* \* \*

UNITED STATES PATENT AND TRADEMARK OFFICE
CERTIFICATE OF CORRECTION

PATENT NO.       : 8,548,707 B2                                            Page 1 of 1
APPLICATION NO. : 12/443647
DATED            : October 1, 2013
INVENTOR(S)      : Bastian Witte It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1131 days.

Signed and Sealed this

Fifteenth Day of September, 2015

Michelle K. Lee
*Director of the United States Patent and Trademark Office*